INVENTOR.
JESS C. LITTLE
BY
ATTORNEY

Dec. 29, 1959            J. C. LITTLE            2,918,783

LINK STRUCTURE MADE OF PREFORMED HELICAL WIRE ELEMENTS

Filed July 31, 1957            2 Sheets-Sheet 2

INVENTOR.
JESS C. LITTLE
BY
*J. D. Douglas*
ATTORNEY

United States Patent Office 2,918,783
Patented Dec. 29, 1959

2,918,783
LINK STRUCTURE MADE OF PREFORMED HELICAL WIRE ELEMENTS

Jess C. Little, Cleveland Heights, Ohio, assignor to Textron, Inc., Providence, R.I., a corporation of Rhode Island Application July 31, 1957, Serial No. 675,466

12 Claims. (Cl. 57—144)

This invention relates to a link structure for guy wires and the like.

Commonly, telephone and power line poles are provided with a guy wire which at one end is anchored in the ground or to some suitable structure and extends from its anchor for connection to the pole. This connection is made through an insulator connected to the end of the guy wire and a link connecting the insulator to the pole. In many instances the spacing between this insulator needs to be relatively short and this gives rise to difficulty in providing a suitable connecting link which will fit in this space and also be capable of withstanding the tensile pull exerted by the guy wire.

The present invention is directed to a link which is well adapted for this particular purpose and which also may be used to advantage wherever it is desired to provide a link of relatively short length which is capable of withstanding appreciable tensile load.

Accordingly, it is an object of this invention to provide a novel and improved link structure.

In the following detailed description there are disclosed two presently preferred embodiments of the invention, which are illustrated in the accompanying drawings.

Figure 1:
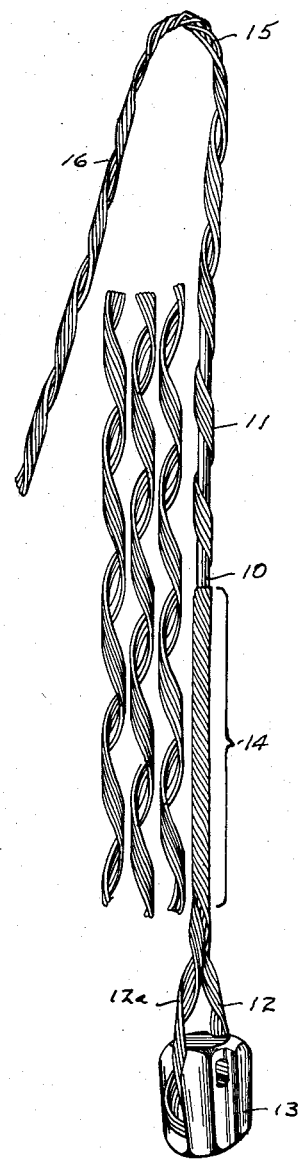
Figure 1 shows a first embodiment of the present link partly assembled together and connected to the insulator with which it is to be associated.

Referring first to Fig. 1, there is provided an elongated core 10 in the form of a rigid cylindrical metal rod around which is disposed the central portion 11 of a body composed of helically preformed wire elements of high tensile strength galvanized steel, aluminum or other suitable material. Alternatively, the core may be a tube, stranded cable or other elongated, dimensionally stable body.

In the embodiment illustrated six of these helically preformed wire elements are adhesively secured together in side-by-side coaxial parallelism, with the respective helices formed by the several wire elements having a common axis, to form a "half-lay" body, that is, one which extends half way around the circumference of the core 10 at any given point along the latter's length. The wire elements have a constant uniform pitch throughout their respective lengths. The internal diameter of the half-lay body is somewhat less than the outside diameter of the core 10, so that the central portion of the body tightly grips the core throughout the length of the core. The preformed wire elements which make up the half-lay body have a pitch which is sufficiently open for the half-lay body to be wrapped around the core from the side of the core without exceeding the elastic limit of the material of which the elements are composed. Instead of being adhesively secured together, the helical wire elements may be secured together by clips or any other suitable means.

At one end the half-lay central portion 11 of the helically preformed body extends beyond the end of the core 10 and is bent back upon itself to form a loop 12, the bight of which extends through a conventional insulator 13. The return leg 12a of this loop extends back toward the adjacent end of core 10 and is wrapped tightly around the core between the convolutions of the central half-lay body portion 11 for almost one-half the length of the core. Thus these intertwisted half-lay portions together make up a whole lay segment 14 which completely encloses and tightly grips the core 10 throughout almost one-half its length.

Figure 2:
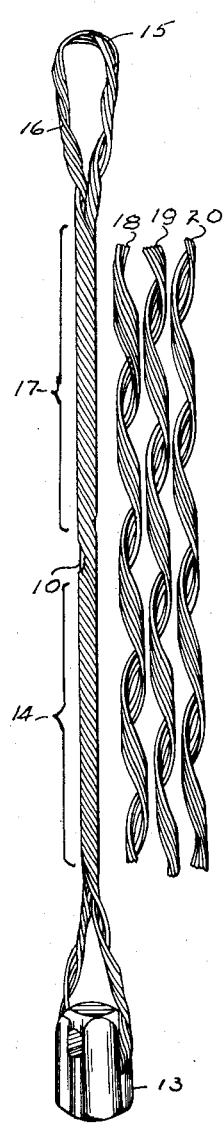
Figure 2 shows the Fig. 1 link in a later stage of its assembly.

Similarly, at the opposite end of the core the central half-lay body portion 11 extends beyond the end of the core and is bent back upon itself to define a loop 15 and a return half-lay leg 16. After being inserted through an eyebolt or other suitable fastening device on the pole, which is then disposed at the bight of loop 15, the return half-lay leg 16 is wrapped around the core between the convolutions of the central half-lay body 11, as shown in Fig. 2. The return leg 16 and the central half-lay body 11 together make up a whole lay segment 17, which completely surrounds and grips the core 10 throughout approximately the remaining half of its length. The ends of the respective return legs 12a and 16 terminate somewhat short of each other, as shown in Fig. 2, or else may abut endwise against one another.

Figure 3:
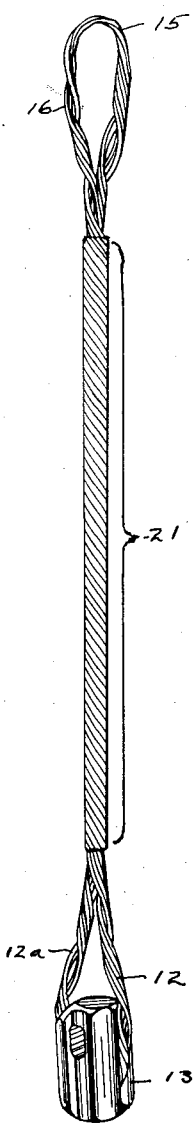
Figure 3 shows the link of Figs. 1 and 2 fully assembled.

The assembly is completed by three "one-third lay" sets 18, 19 and 20 of helically preformed elements. These sets are made up of preformed wire helixes arranged side-by-side in coaxial parallelism and having a length about equal to that of the core 10. These sets 18—20 of helically preformed elements have an internal diameter slightly less than the outside diameter of the whole-lay helical segments 14 and 17 so as to tightly grip the latter when placed thereon. They have an open pitch so that they may be applied to the whole-lay segments 14 and 17 from the side without exceeding the elastic limit of the material of which they are composed. The sets 18—20 when applied to the whole lay segments are intertwisted coaxially with one another. When the assembly is completed, the sets 18—20 together make up a "whole-lay" tubular sheath 21 which tightly grips the whole-lay segments 14, 17 throughout the length of the enclosed core 10, as shown in Fig. 3.

Preferably, the preformed wire helices which make up the outer sets 18—20 have grit or other suitable friction material on their inner faces to enhance the friction between them and the "whole lay" segments 14 and 17. Alternatively, the same result may be accomplished by providing such material on the outside of the whole lay segments 14 and 17. If desired, the friction between the core 10 and the "whole lay" segments may also be enhanced by providing friction material on the inside of the "whole lay" segments 14 and 17 or on the outside of the core.

In the use of this embodiment, the end loop 15 is received in an eyebolt attached to the telephone or power line pole. The end of the guy wire, for which the present invention provides a connecting link to the pole, is connected to the insulator 13. The guy wire extends to its anchor at its opposite end and is under tension, in the usual manner.

This embodiment is considered preferable because the pairs of legs which extend from each end loop 12 and 15 onto the core 10 are disposed in balanced, 180° relationship at their engagement with the core, this relationship being inherent in their "half-lay" construction. For this reason the tensile pull on these legs is in symmetrical, balanced relationship about the core 10 and thus there is no tendency to bend the core or to displace it from coaxial alignment with the guy wire which is exerting the pull.

Figure 4:
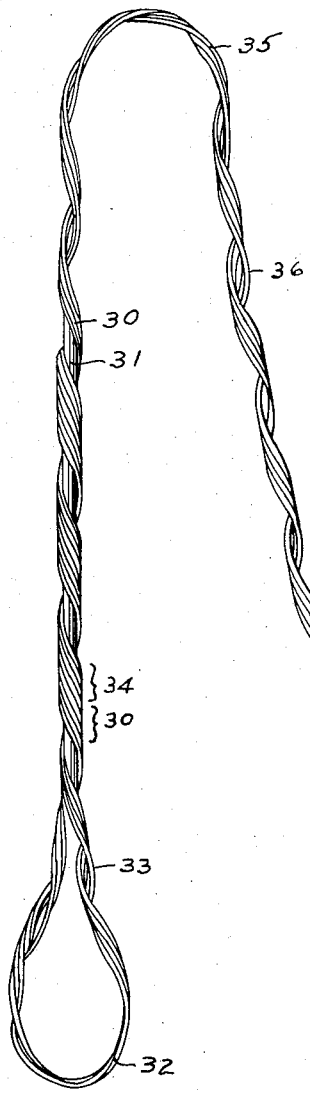
Figure 4 shows a second embodiment of the link partly assembled.
Figure 5:
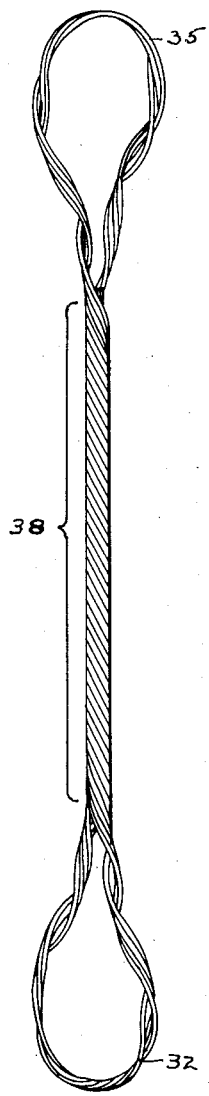
Figure 5 shows the Fig. 4 link fully assembled.
Figure 6:
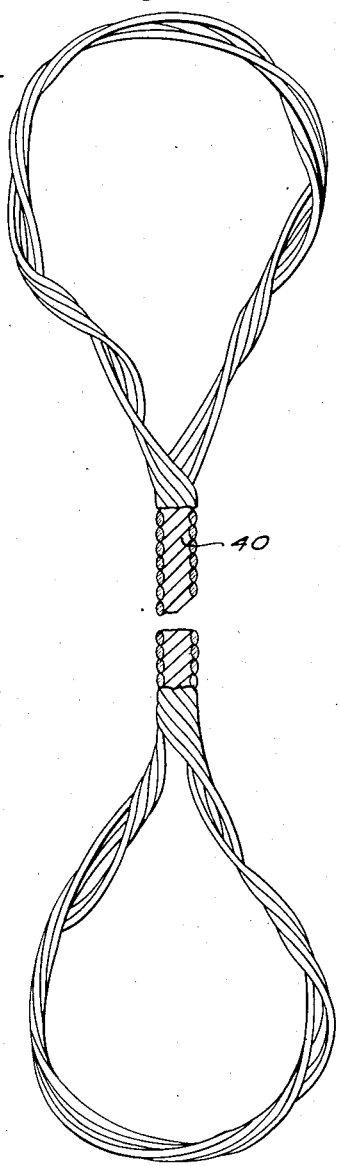
Fig. 6 is an enlarged broken view, partly in elevation and partly in section of a modification of my invention.

Another embodiment of the present invention is illustrated in Figs. 4 and 5. In this embodiment, the central portion 30 of the helically preformed body is in the form of a plurality of preformed helical wire elements secured together in coaxial, side-by-side parallelism and making up a "one-third lay" portion disposed about the core 31. That is, at any point along the core the central portion 30 of the helically preformed body extends one-third of the way around the circumference of the core. The wire elements may be secured together by adhesive, by clips, or by any other suitable means.

At one end of the core, the helically preformed body continues from the central portion 30 and presents a loop 32 disposed beyond the end of the core and bent back upon itself. The return leg 33 of this loop extends back to the core and continues as a "one-third lay" portion 34 which extends back along the entire length of the core in side-by-side relation to the central portion 30 of the helically preformed body, as best seen in Fig. 4.

At the opposite end of the core, the helically preformed body continues from the central portion 30 and presents a loop 35 disposed beyond the end of the core and doubled back upon itself. The return leg 36 of this loop extends to the core and continues as a "one-third lay" portion which is wrapped around the core 31 throughout the latter's entire length in side-by-side interfitting relationship between the central portion 30 and the return portion 34 from the opposite end loop.

Thus, the central portions 30 and the return portions 34 and 36 of the helically preformed reinforcement body together make up a "whole lay" segment 38 (Fig. 5) which completely encloses the core 31 throughout substantially its entire length.

As in the preceding embodiment, the helically preformed wire elements are preformed to have an internal diameter slightly less than the outside diameter of the core. Also, they have an open pitch sufficient for them to be applied to the core from its side without exceeding the elastic limit of the material of which they are composed. If desired, friction material may be provided on the inside of the "whole lay" segment 38 or on the outside of the core 30 to enhance the friction between them. In the assembly of this link, after having applied the central portion 30 to the core 31, the end loop 32 is inserted through the insulator or other fitting and the return portion 34 then is wrapped around the core. The opposite end loop 35 similarly is inserted through the eye bolt or other fastener on the pole and then the return portion 36 is wrapped around the core to complete the assembly.

While the foregoing description is directed specifically to two presently preferred embodiments of the present link structure and described one particular use to which it may be put, it is to be understood that the present invention is of general utility wherever it is desired to provide a link having its advantageous characteristics and that various modifications, omissions and refinements which depart from the illustrated embodiments of the link may be adopted without departing from the spirit and scope of this invention. For example, under some conditions the central core might be omitted, leaving the intertwisted portions of the helically preformed body forming a hollow, self-sustaining, tubular segment 40 between the end loops.

I claim:

1. A link structure comprising an elongated core and a helically preformed body tightly encircling the core, said body comprising a central portion disposed helically about the core in gripping engagement therewith, a first end portion continuing from one end of said central portion and forming a loop and presenting a return leg which is disposed helically about the core in gripping engagement therewith between the successive helical convolutions of said central portion, and a second end portion continuing from the opposite end of said central portion and forming a loop and presenting a return leg which is disposed helically about the core in gripping engagement therewith between the successive helical convolutions of said central portion.

2. The link structure of claim 1, wherein said helically preformed body is composed of a plurality of preformed helical wire elements of the same constant pitch throughout and secured together side-by-side in coaxial parallelism, and said body has an open pitch enabling it to be placed on the core from the side of the core without exceeding the elastic limit of the material of which the helical wire elements are composed.

3. The link structure of claim 2, wherein said central portion of the body and the return legs completely enclose and grip the core throughout the major portion of its length.

4. The link structure of claim 3, wherein said helically preformed body throughout its length is in the form of a half-lay of said wire elements, with the central portion of the body and each of the return legs together making up a whole lay enclosure for the core.

5. The link structure of claim 4, wherein there is provided a plurality of helically preformed wire elements which form a whole lay engaged around the outside of the central portion of the body and the return legs in gripping engagement therewith.

6. The link structure of claim 3, wherein said central portion of the helically preformed body overlies one-third of the circumference of the core throughout substantially its entire length, the first-mentioned return leg extends next to one edge of the central portion of the body and overlies the adjacent one-third of the circumference of the core throughout substantially its entire length, and the second-mentioned return leg lies between the first-mentioned return leg and the opposite edge of the central portion of the body and overlies the remaining one-third of the circumference of the core throughout substantially its entire length.

7. A link structure comprising a helically preformed body having an elongated helical central portion, a first end portion continuing from one end of said central portion and forming a loop and presenting a helical return leg which extends between the successive helical convolutions of said central portion in coaxial parallelism with said central portion, and a second end portion continuing from the opposite end of said central portion and forming a loop and presenting a helical return leg which extends between the successive helical convolutions of said central portion in coaxial parallelism with said central portion, said central portion and each of the return legs being of uniform open pitch throughout.

8. The link structure of claim 7, wherein said central portion and the return legs make up a tubular enclosure throughout the major part of the length of said central portion.

9. The link structure of claim 8, wherein said helically preformed body is composed of a plurality of preformed helical wire elements adhesively secured together in coaxial parallelism.

10. A link structure comprising an elongated core, a helically preformed body tightly encircling the core and made up of a plurality of preformed helical wire elements of constant open pitch adhesively secured together side-by-side in coaxial parallelism, said helically preformed body having an elongated central portion disposed helically around the core in gripping engagement therewith throughout substantially its entire length, a first end portion continuing from one end of said central portion and forming a loop and presenting a return leg which is disposed helically around the core in gripping engagement therewith between the helical convolutions of said central portion and in side-by-side coaxial parallelism therewith, and a second end portion continuing from the opposite end of said central portion and forming a loop and presenting a return leg which is disposed helically around the core in gripping engagement therewith between the helical convolutions of said central portion and in side-by-side coaxial parallelism therewith.

11. The link structure of claim 10, wherein said helically preformed body is in the form of a half-lay of said wire elements, with the central portion of the body and the first-mentioned return leg together making up a whole lay of said elements completely enclosing the core from the adjacent end of the core toward the middle of the core, and with the central portion of the body and the second-mentioned return leg together making up a whole lay of said elements completely enclosing the core from its opposite end toward the middle of the core, the ends of said return legs terminating short of one another, and wherein there is provided a plurality of helically preformed elements in side-by-side coaxial parallelism with one another and enclosing said body in gripping engagement therewith throughout substantially the entire length of the enclosed core.

12. The link structure of claim 10, wherein said helically preformed body is in the form of a one-third lay of said elements, with the central portion of the body extending helically around one-third of the circumference of the core and each of the return legs extending helically side-by-side around the remaining portion of the circumference of the core throughout substantially the entire length of the core.

References Cited in the file of this patent

UNITED STATES PATENTS

| | | |
|---|---|---|
| 1,703,269 | Garris | Feb. 26, 1929 |
| 2,761,273 | Peterson | Sept. 4, 1957 |

FOREIGN PATENTS

| | | |
|---|---|---|
| 28,444 | Great Britain | Dec. 16, 1909 |